PETER PFEIFER.
Improvement in Horse Hay Rakes.
No. 119,532.    Patented Oct. 3, 1871.
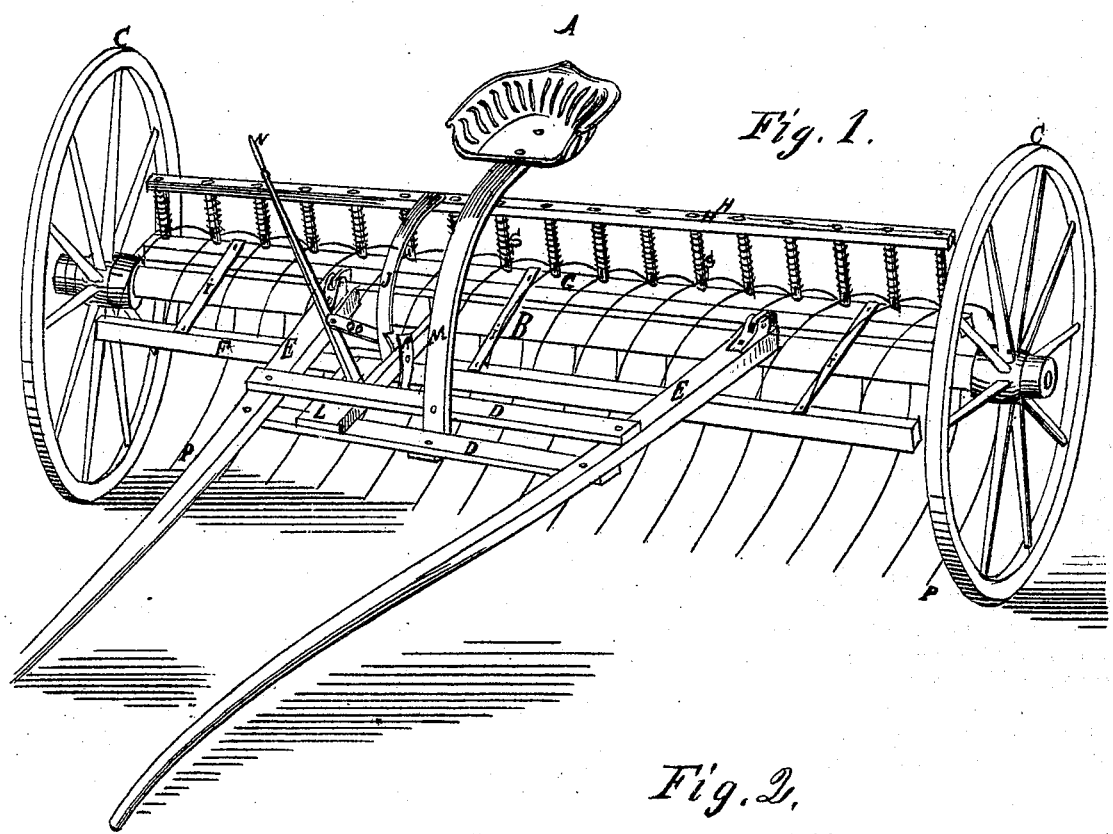

UNITED STATES PATENT OFFICE.

PETER PFEIFER, OF DURHAMVILLE, NEW YORK.

IMPROVEMENT IN HORSE HAY-RAKES.

Specification forming part of Letters Patent No. 119,532, dated October 3, 1871.

*To all whom it may concern:*

Be it known that I, PETER PFEIFER, of Durhamville, in the county of Oneida and State of New York, have invented certain Improvements in Horse-Power Rakes, of which the following is a specifiation:

The invention consists, first, in an improved arrangement of the locking mechanism in relation to the rake; and, secondly, in a method of attaching the teeth to the rake-head.

Figure 1 is a perspective view of a machine to which the improvements are applied. Fig. 2 is a detached view, showing the tooth-fastening.

A is the driver's seat attached to the seat-spring M, which is fastened to the cross-bars D. B is the axle-tree; C C, the wheels. E E are the thills, braced by the cross-bars D and brace L. F is a bar on the under side of the thills and forward of the axle-tree, to which the rake-teeth are fastened. Three iron braces, I, connect the bar F to the bar G, which is pivoted on top of the axle-tree, and thus forms the fulcrum of the rake. Between the bar G and two light bars, H, the guides S for the teeth are held. These guides are surrounded by coiled springs, and are of the usual construction. J is a quadrant-brace connecting the bars H to the rake-head F, provided with notches for holding the rake down or up. K is a latch, held in the lower notch of the quadrant-brace by a spring on its lower side. N is a hand tilting-lever, fastened to the brace L and connected, by bars O, to the rake-head. When the rake is elevated it is so held by the upper end of the bars O engaging with the upper notch of the quadrant-brace J. P are rake-teeth, of ordinary construction. Q is a socket on the rear of the rake-head for the reception of the right-angled head of the tooth. The tooth, when thus inserted, is held firmly therein by a metallic spring-button pivoted adjacent to the socket Q. R is the spring-button, provided with an upturned spring end, as shown at R', Fig. 2. This spring end, by exerting its pressure on the tooth P, retains it in place, and also prevents the button from releasing itself through the vibrations of the rake. Teeth held in this manner are easily removed and replaced whenever required.

Having thus fully set forth the invention, I claim—

1. The combination and arrangement of the lever N, connecting-bar O, and spring-latch K with the notched quadrant-brace J, rake-head F, and bars H, substantially as shown and described.

2. The combination of the spring-button R and socket Q with the head of the rake-tooth P, as and for the purpose described.

PETER PFEIFER.

Witnesses:
J. R. YOMAN,
B. O. WALKER.

(47)